United States Patent [19]

Elkins

[11] Patent Number: 5,149,495
[45] Date of Patent: Sep. 22, 1992

[54] WATER ROD FOR NUCLEAR REACTOR AND METHOD FOR PROVIDING AND USING SAME

[75] Inventor: Robert B. Elkins, San Jose, Calif.

[73] Assignee: General Electric Company, San Jose, Calif.

[21] Appl. No.: 527,901

[22] Filed: May 24, 1990

[51] Int. Cl.$^5$ .............................................. G21C 3/32
[52] U.S. Cl. .................................. 376/444; 376/447; 376/458
[58] Field of Search ................. 376/444, 447, 458, 459

[56] References Cited

U.S. PATENT DOCUMENTS

| | | | |
|---|---|---|---|
| 4,686,079 | 8/1987 | Ishikawa et al. | 376/444 |
| 4,863,680 | 10/1989 | Sakurada et al. | 376/444 |
| 4,876,062 | 10/1989 | Aoyama et al. | 376/444 |
| 4,926,450 | 5/1990 | Masuhara et al. | 376/444 |
| 4,970,047 | 11/1990 | Ueda et al. | 376/443 |

*Primary Examiner*—Brooks H. Hunt
*Assistant Examiner*—Meena Chelliah
*Attorney, Agent, or Firm*—Robert R. Schroeder

[57] ABSTRACT

Water rod configurations, such as for a boiling water nuclear reactor, are provided. An efficiency parameter is defined which relate to how well-used the sacrificed fuel rod positions are. Four particular water rod configurations are described, which produce high efficiency, such as having a water rod efficiency greater than about 0.6, preferably greater than about 0.7. Desired moderation is achieved by providing for sacrifice of more than four and less than nine lattice positions. The first "peanut" configuration has a cross-section with two round-cornered triangular regions, integrally connected by a constricted portion. The second configuration has a substantially rectangular cross-section. The third "clover" configuration has a four-lobed shape. The fourth "figure 8" configuration has two substantially circular cross-sectional portions. A method for analysis and design, using a new efficiency parameter, is provided. An apparatus and method for maintaining the water rod and associated fuel rods in the desired spaced configuration is effected by devices for engagement. The engagement devices use resilient deflection to produce engagement of the water rods with spacer apparatus.

18 Claims, 4 Drawing Sheets

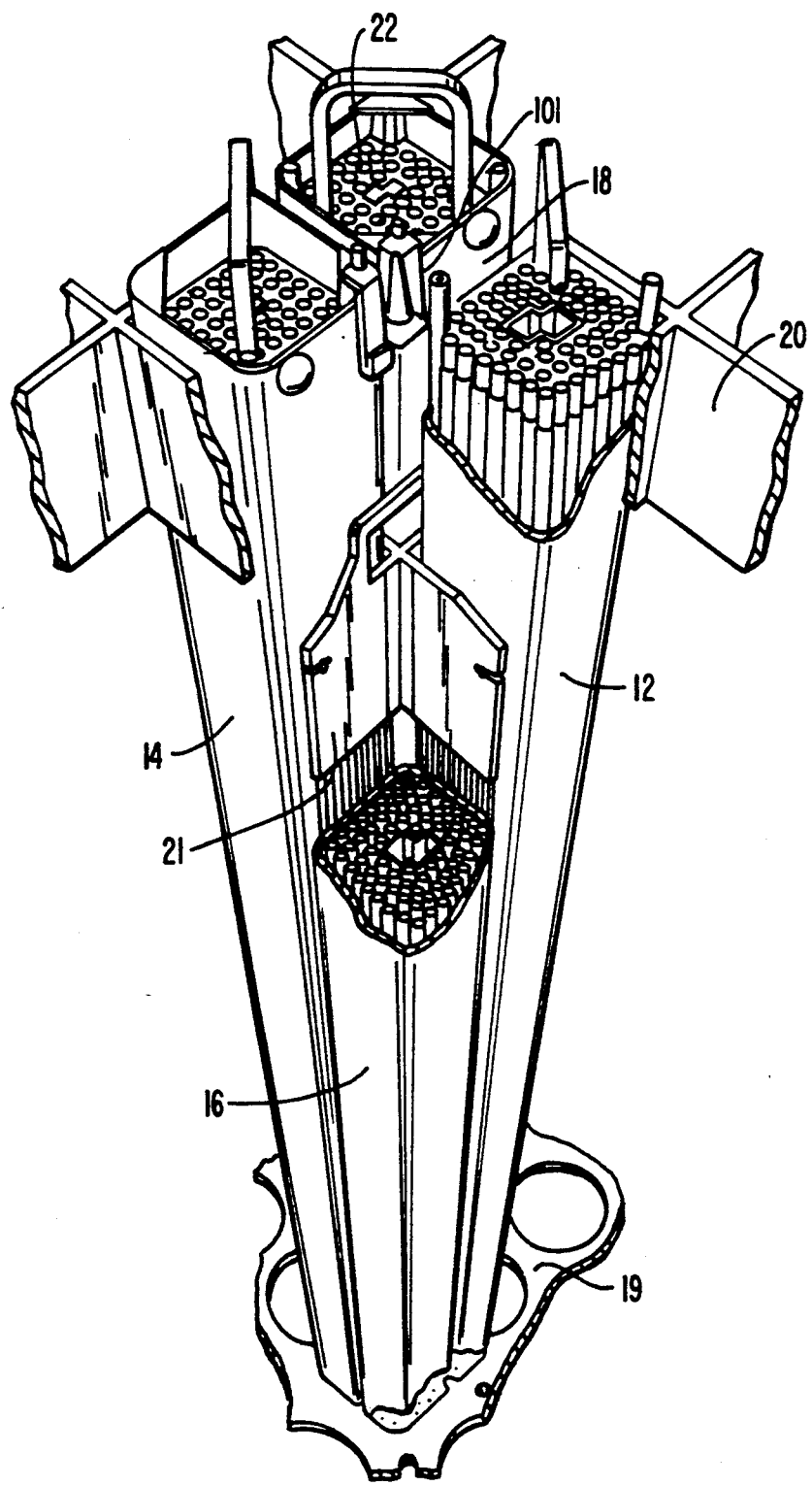
FIG._1.

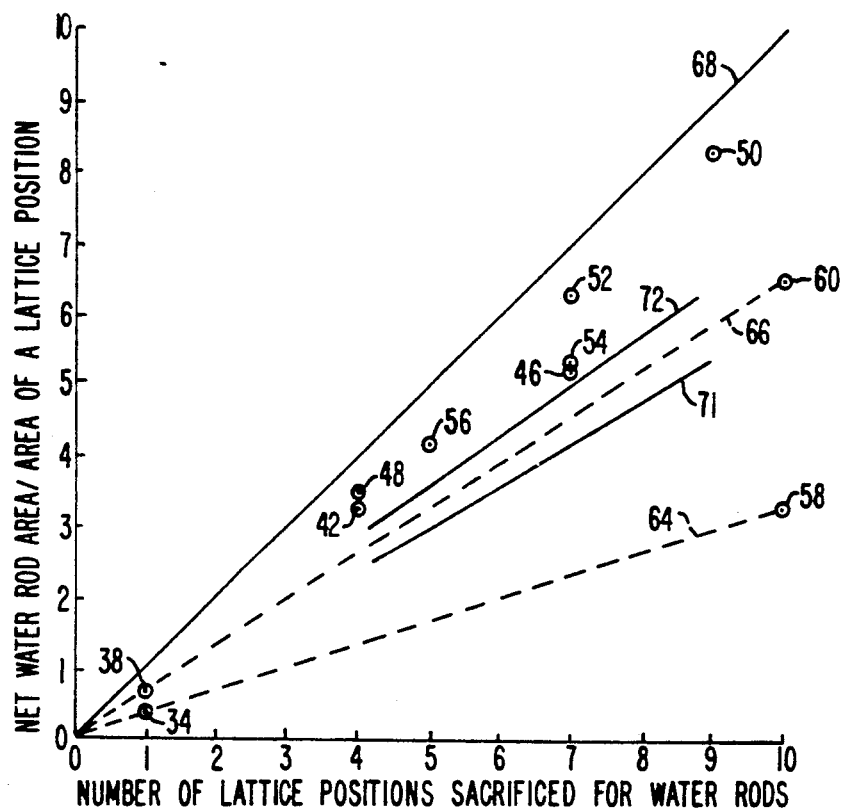
FIG._2.
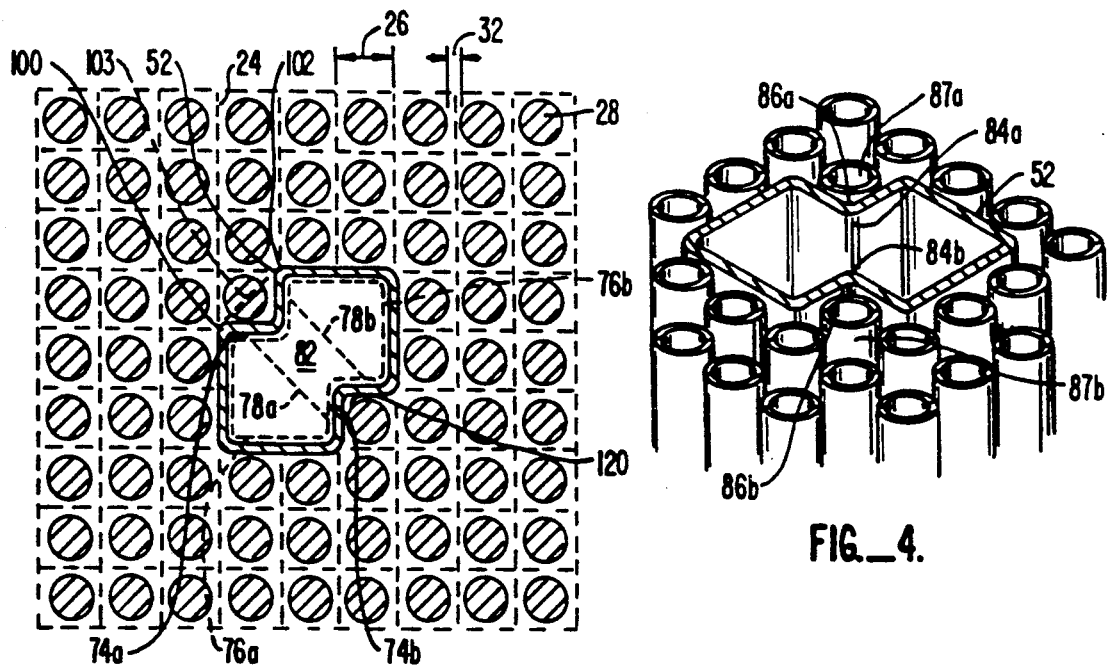
FIG._3.
FIG._4.

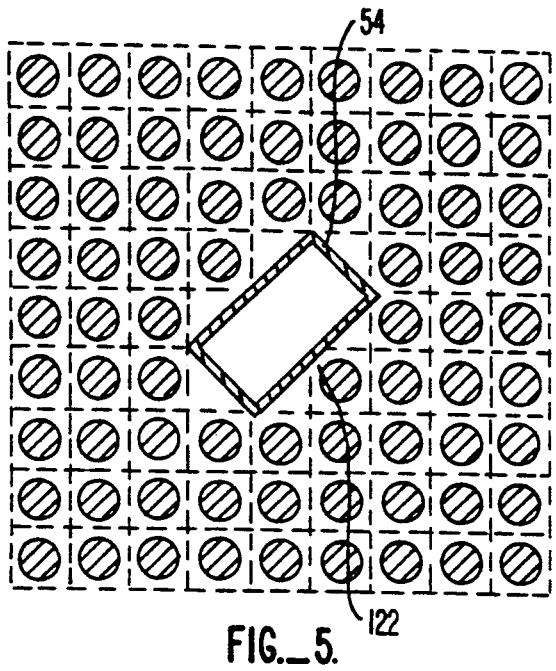
FIG._5.
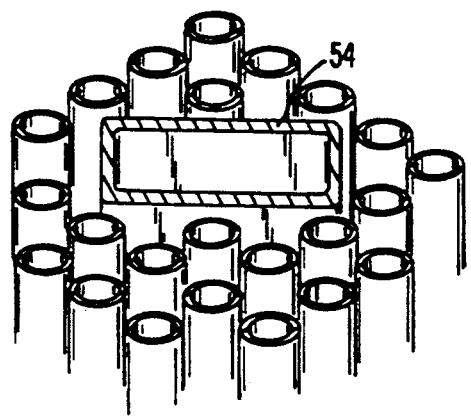
FIG._6.
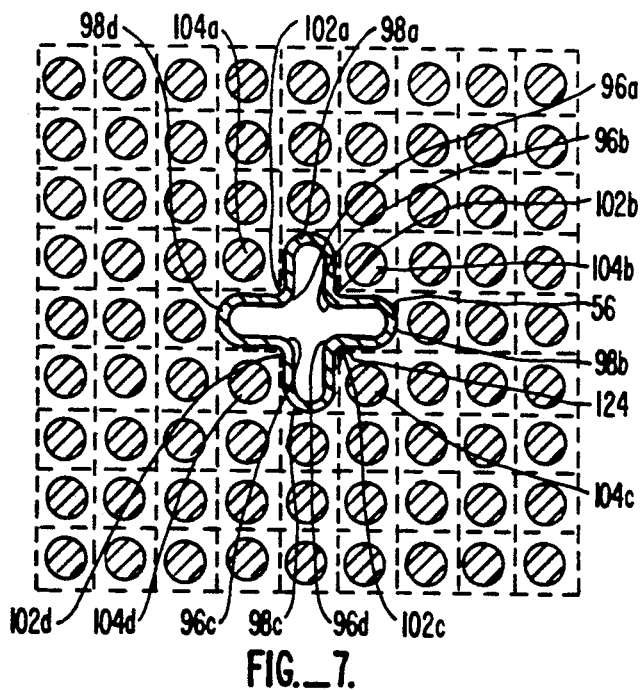
FIG._7.
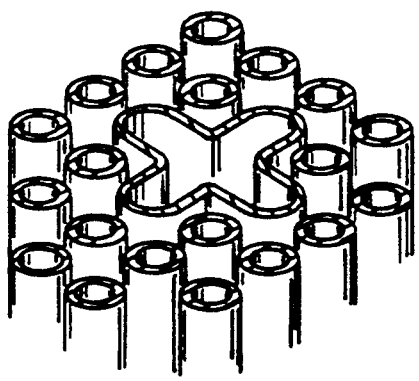
FIG._8.

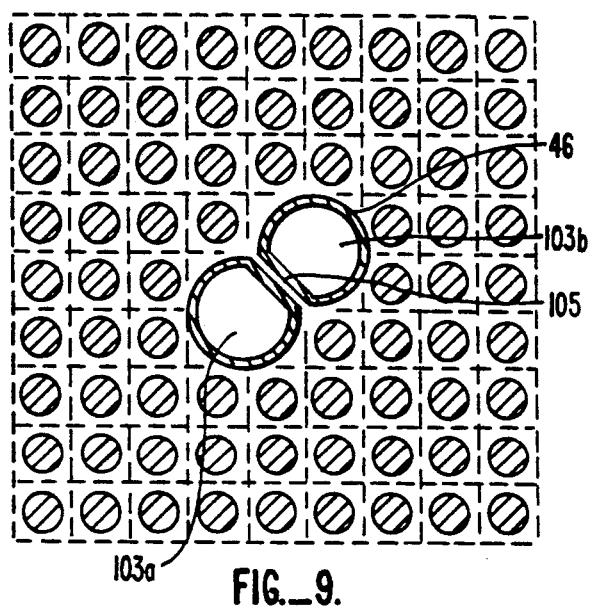
FIG._9.
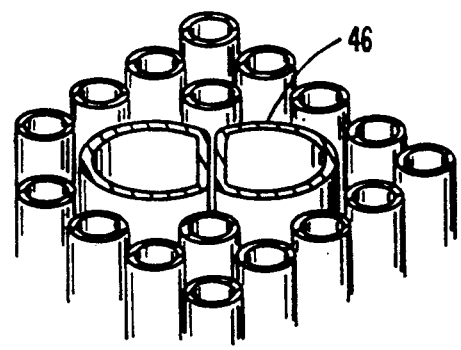
FIG._10.
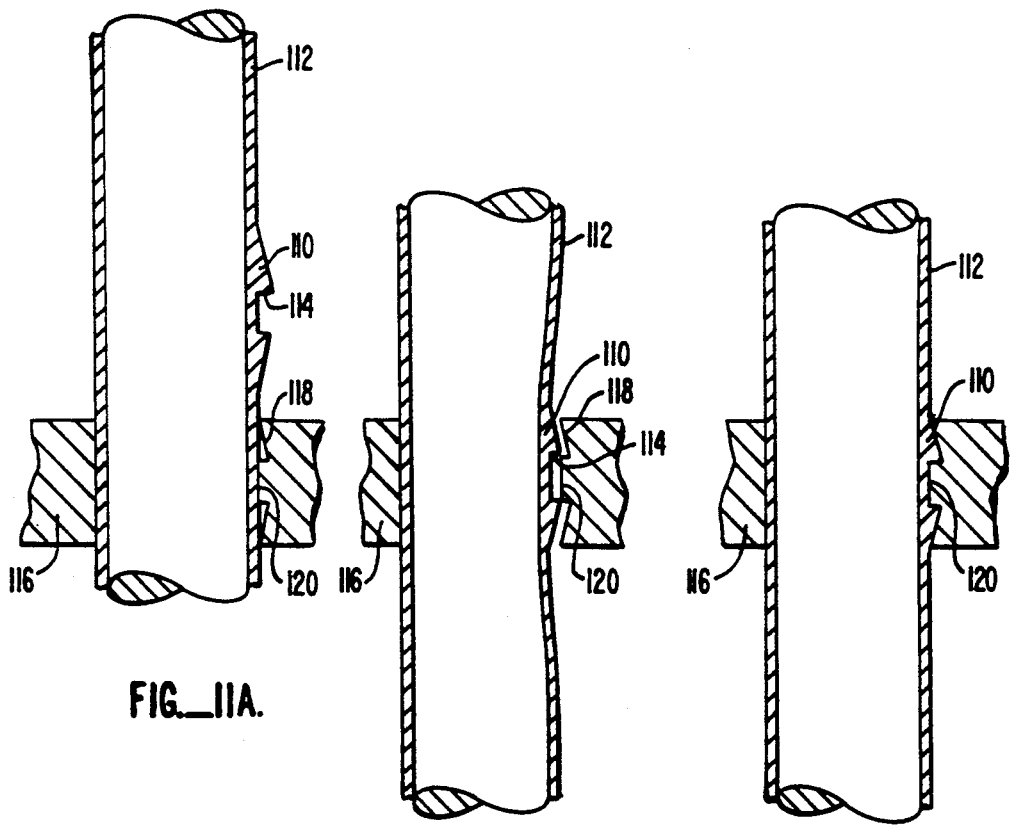
FIG._11A.   FIG._11B.   FIG._11C.

WATER ROD FOR NUCLEAR REACTOR AND METHOD FOR PROVIDING AND USING SAME

FIELD OF THE INVENTION

The present invention relates to a water rod for a nuclear reactor and, in particular, to a tubular rod for enclosing substantially unvoided water in boiling water nuclear reactors.

BACKGROUND OF THE INVENTION

In a typical boiling-water reactor, fuel is provided in a number of fuel rods. The fuel itself is in the form of cylindrical pellets of enriched uranium. Enrichment is the proportion of fissionable $U^{235}$ to the non-fissionable $U^{238}$. These pellets are enclosed in a long cylindrical tube and sealed at both ends. The cylindrical tube with the enclosed fuel pellets is known as a "fuel rod." The rods are provided in the reactor in a number of discrete packages, which are called "fuel bundles."

Each bundle includes a plurality of rods held between an upper tie plate and a lower tie plate. The tie plates contain seats or apertures for positioning and holding the ends of the fuel rods. Additionally, the tie plates include apertures for permitting a flow of water therethrough in the interstices between the fuel rods.

Each fuel bundle is surrounded by a fuel channel. This channel, which is typically square in section, extends from the lower tie plate to the upper tie plate. The channel functions to confine water flow in between the tie plates and around the fuel rods.

Typically seven spacers are substantially evenly spaced along the length of the fuel bundle inside the fuel channel. The spacers act to further position the fuel rods along their longitudinal extends. An upper handle portion typically attached to the upper tie plate and a lower nose piece protruding downward from the lower tie plate define the top and bottom of the fuel bundle. The handle and nose piece function to permit ready insertion and removal of the fuel bundles during so-called "reactor outages."

Individual fuel rods in a bundle are disposed in a matrix, and are normally arrayed in rows and columns. Typically, some of the rows and columns in the matrix are occupied by tie rods. The tie rods are threaded fuel rods which engage the upper and lower tie plates to provide structural integrity to the fuel bundle. A typical fuel rod is approximately 160 inches in length.

In a reactor, a plurality of fuel bundles are positioned in the reactor core. Fuel bundles are positioned between a lower core plate and an overlying top guide. The fuel bundles are supported within the core of the reactor at the elevation of the core plate, and are held in vertical spaced apart relationship at the top guide.

Each fuel bundle in the reactor core is typically spaced apart from its neighboring fuel bundles. This spacing establishes a water filled volume in the reactor core known as the core bypass region. Water is maintained in this core bypass region by metering of a small amount of water through the fuel bundle nozzles.

The nuclear reaction is controlled by a number of control rods or blades. These are typically in a cruciform shape so that each control blade is adjacent to four fuel bundles. The control rods are inserted into and out of the core bypass region. These control rods contain neutron absorbers such that insertion of the control rods will locally slow or stop the reaction from being critical.

During operation of the reactor, water enters the fuel bundle through the lower tie plate. The water rises through the fuel bundles because of heating, and also, where used, from the action of one or more pumps in forcing circulation through the reactor. As the water rises through the fuel bundles and is increasingly heated, during normal operation, it eventually reaches its boiling point. Steam is formed from the boiling water, causing steam voids in the upper portion of the fuel bundle.

The water in a boiling-water reactor performs two functions. First, the water carries away heat from the reactor so that it can be converted to useful energy by, for example, a turbine. Second, the water acts as a moderator, i.e., it slows down the "fast" neutrons.

Neutrons in a nuclear reaction are present at a variety of energy levels. The neutrons are generally referred to as "fast" neutrons and "slow" (or "thermal") neutrons. Slowing down of the fast neutrons is desirable for at least two reasons. First, the slow neutrons are more reactive in the sense that they maintain the desired chain reaction involving the fission of $U^{235}$ atoms. Second, slower neutrons are more easily captured by the control blades than the faster neutrons. Therefore, a moderator, in effect, increases the efficiency of the control blades.

As noted, water is a moderator of fast neutrons. However, as water is heated, it becomes less dense and less effective as a moderator. When the water becomes steam, its effectiveness as a moderator decreases drastically, and can be, for some purposes, treated as a negligible moderator.

In early fuel bundle designs, all lattice positions in the bundle were occupied by fuel rods. In these early designs, the only space for water in the interior of a fuel bundle was the space between the fuel rods and in the interstitial volume between discrete fuel bundles. Because the space between rods is typically filled with a mixture of water and steam, the moderating effectiveness of this space is less than space between bundles containing "solid" moderator. Accordingly, the most effective moderating water of the reactor was positioned between fuel bundles, i.e., in the core bypass region in the interstices between the bundles, exterior to the fuel channels.

In such earlier configurations, the interior fuel rods in any fuel bundle were a large distance away from the large volumes of "solid" moderating water. Because of this distance, the most interior positions in the fuel bundle had large ratios of fast to slow neutrons, and were, therefore, less efficient in maintaining those nuclear reactions requiring "slow" or "thermal neutrons". Accordingly, interior rods were typically more enriched to compensate for this lack of efficiency. Such increase in rod enrichment, however, is rather expensive. Therefore, it was previously decided to provide for additional moderating water in interior positions of a fuel bundle.

Initially, one or more fuel rods were replaced with a hollow rod (called a "water rod") of equal diameter for flowing water therethrough. The water rod communicated with the lower tie plate and extended through the upper tie plate. The water rod has its own confined water flow path and as a consequence is (like the bypass region) filled with water moderator.

A water rod has nuclear and thermal advantages over simply leaving a spaced unoccupied by a fuel rod. By providing a hollow rod, the subcooled water inside is prevented from mixing with the other heated water in the bundle, and is somewhat insulated. The water in the rod, therefore, does not boil as does other water in the bundle.

This scheme provided some advantages because of the additional moderator in the interior positions of a fuel bundle. Initially, the water rods were the same size as the fuel rods. Later, attempts were made to provide larger diameter water rods in the fuel bundles, these later water rods exceeding the size of the ordinary fuel rod. These attempts to provide larger water rods involved merely positioning a standard round cross-section pipe, or, in some cases, a square cross-section pipe, in interior positions of a fuel bundle so as to displace one or more fuel rods. No effective attempt was made, however, to depart from spaced-apart, standard round or square tubes, or to systematically analyze the effect of these shapes on reactor efficiency.

Since fuel rods when viewed in horizontal section are arranged in rows and columns, it is common to refer to each fuel bundle as occupying a "lattice position". When the water rods were expanded in size, they intruded from one fuel rod position into those fuel rod positions occupied by adjacent fuel rods.

As water rod design progressed, a configuration was provided in which a water rod had a circular cross-section with a diameter sufficiently large that it occupied more than one lattice position. In one such design, four lattice positions were sacrificed to accommodate a circular water rod. Water rods have also been developed which have a substantially square cross-sectional configuration, and occupy four or nine such lattice positions.

Design Configuration

In the development of new water rod design, it has been necessary to bring together certain design considerations. While these considerations have been generally known, I am unaware of their collective use which enables a design as herein disclosed. I therefore set forth the considerations, followed by the design. It will be understood that this assemblage constitutes together my invention.

One aspect of water rod design, which has not previously been systematically addressed, is the displacement of fuel rods from their lattice positions. Provision of a water rod necessarily requires reduction of the number of fuel rods in a bundle, and thus results in a reduction of the amount of fuel in a bundle. In spite of the sacrifice of space for fuel, provision of the water rods has been found useful because of the greater overall efficiency obtained when moderating material is positioned interior to a fuel rod bundle. As noted above, because more fuel rods are positioned closer to the moderator, more fuel rods can be provided with lessened enrichment. This reduces fuel costs without sacrificing reactor power.

Another factor related to reactor design is the impact on various safety factors. Understanding of this aspect will be promoted by a brief discussion of certain safety factors.

Safety requirements provide several constraints on reactor design and operation. It must always be possible to shut down the reactor at any point during its operation. Because a boiling water reactor is most reactive when it is relatively cool, such as during start-up phases, the limiting factor of shut-down ability, is the cold-state reactivity margin. This must always be maintained at least 1% of reactivity.

In a boiling water nuclear reactor, fast neutrons induce their own nuclear reactions. In many these fast neutron nuclear reactions, plutonium is produced. Unfortunately, plutonium is more reactive when the reactor is in the cold state. It is thus known that high fluxes of fast neurons can reduce the cold state reactivity margin.

In addition to the cold shut-down margin, there is also a hot operating margin. It is desirable that the reactor be operated on a continuing basis near its fuel power. However, the normal continuing operation of a reactor requires that some control rods be positioned in the reactor, even at a full-power state, in order to shape the reaction, i.e., to reduce or eliminate hot spots in the reactor. Accordingly, the reactor must be designed so that the full power reactivity is less than the power that would result if all control rods were withdrawn. This difference in reactivity is known as the "hot excess margin." It is typically desirably about 1%.

The reactor reactivity, then, can be viewed as constrained by a "window" of reactivity. It must maintain the cold shut-down margin, and it must also be capable of producing the hot excess margin. This window of operating constraints is referred to as the "hot-to-cold swing."

Additional moderator in the bundle improves the above-described cold shut-down margin. This is at least partly because more moderating water produces a higher ratio of thermal neutrons. Thermal neutrons are not as efficient in producing plutonium. Therefore, more water generally results in less creation of plutonium. Plutonium is known to increase cold reactivity. Thus, more water, in general, will desirably resulting less cold reactivity.

More water in the fuel bundle also improves the hot excess margin. This is because a larger amount of water increases reactivity by providing more thermal neutrons. Because the increase of water in the fuel bundles helps with both the cold shut-down margin and the hot excess margin, it provides a bigger hot-to-cold swing.

In addition to safety considerations, another factor is the life span of a fuel load. Reactivity generally decreases as the particular fuel load ages. Thus, the cold shut-down margin must be within safety requirements when the fuel load is new and most reactive. This places an upper limit on the reactivity of a new fuel load. As the fuel load ages, reactivity drops to the point where refueling becomes necessary. Refueling is an enormously expensive proposition, and any extension of the amount of time between fuel loads is greatly beneficial. Thus, if the rate at which the reactivity drops, as a function of aging of the fuel load, can be lessened, it will take more time for reactivity to drop to the point where refueling becomes necessary.

One way of decreasing the rate of this drop in reactivity is to add gadolinium oxide or other "burnable absorbers" to the fuel. These burnable absorbers capture thermal neutrons and inhibit the nuclear reaction; because of this property of inhibiting the nuclear reaction, they are sometimes called "poisons."

Such poisons act to initially decrease reactivity of fuel in the discrete fuel rods. However, because these burnable absorbers are depleted or "burned up" as the reactor ages, it decreases reactivity of a new fuel load more than it decreases reactivity of an aging fuel load.

In this way, the rate at which reactivity decreases with aging is reduced.

However, these burnable absorbers have detrimental effects as well. During the aging stages of a fuel load, there is still some amount of residual burnable absorber, usually gadolinium, which reduces reactivity at a time when such a reduction is not desired. Therefore, it is generally preferable to reduce new-load reactivity without using (or using a reduced amount of) gadolinium.

Another factor which is important in reactor design is the existence of non-nucleate boiling. Instabilities leading to non-nucleate boiling can include both thermal-hydraulic oscillations and coupled nuclear-thermal-hydraulic oscillations. These oscillations are manifested when the two phased pressure drop, particularly in the upper portions of the fuel bundle, becomes too high compared with the single phase pressure drop. The resulting fuel coolant flow has an oscillatory component superimposed on the normal steady state flow.

The above-described hydraulic oscillation may be augmented by the dynamic nuclear-thermal feedback process. As steam voids are created, nuclear reactivity is reduced, since steam is a poor moderator, compared with liquid water. Thus, a negative feedback system can occur whereby the nuclear reaction creates heat which, in turn, creates steam voids. The steam voids then reduce the reactivity, because of poor moderation, leading to a reduction of the heat transferred out of the fuel and an increase in the water-to-steam ratio. The increase in water-to-steam ratio results in increased reactivity, thus beginning the cycle again. Under severe circumstances, this oscillatory behavior of the fuel surface hot flux and the coolant flow rate may result in a non-nucleate boiling process, resulting in a local increase in the fuel cladding temperature. Thus, hydrodynamic oscillations are undesirable.

Some aspects of water rod design are elucidated by a brief discussion of the history of bundle designs. The designs of fuel bundles has shown a progression in the number of fuel rods in a bundle. Early bundles were formed with a 7×7 array of fuel rods, thus having 49 lattice positions. Fuel bundles having an 8×8 array of fuel rods were next produced. Most recently, fuel bundles having an array of 9×9 fuel rods have been produced. The physical size and cross-sectional area of the fuel bundles have not increased; rather, the progression has been to a larger number of smaller-diameter fuel rods in the bundle. The heat generated by smaller fuel rods is more quickly conveyed to the surrounding water. This increased rate of thermal transfer causes an increase in the tendency for nuclear-thermal augmented hydrodynamic oscillations.

Water rods are useful in controlling such oscillations. More "solid" moderator is available to reduce the sensitivity of the nuclear fission rate to changes in the in-channel moderator density. Therefore, the tendency for a hydrodynamic oscillating is reduced.

Although the provision and increase in size of water rods have lead to some desirable results, there are also undesirable effects of larger water rods. First, larger water rods displace more nuclear fuel so that the total heat-generating capacity of the reactor is affected. Second, larger water rods have a larger bundle pressure drop, i.e., difference in water pressure between the bottom tie plate and the top tie plate increases. This increase in pressure drop has been found to be associated in an increased tendency for hydraulic oscillations.

Third, water is known to act not only to slow down neutrons, but also to absorb thermal neutrons. Thus, when too large an amount of water is provided, the water excessively absorbs thermal (as well as fast) neutrons and decreases reactivity of the reactor.

Previous approaches to the problem of configuring a water rod for inclusion within a fuel bundle have generally been empirical in nature. No effective general procedure for analyzing or designing characteristics of water rods has been available. Accordingly, previous designs have largely been confined to conventional tube shapes, such as substantially circular or square cross-sectional tubes.

Some of the problems associated with providing water rods, such as foregoing or sacrificing lattice positions for fuel, have been known. Because there was no general method of analysis, however, the relative benefits and problems of additional moderator were not systematically taken into account in the design. Further, practical considerations, such as the manufacturing feasibility of constructing various rod shapes and the methods for connecting the water rods and fuel rods to each other with the desired spacing, placed additional constrains on the types of water rods previously provided. Accordingly, as noted, previous water rods have typically included only spaced-apart circular or square tubular shapes.

SUMMARY OF THE INVENTION

The present invention includes the provision of a new design parameter for water rods which, in general terms, is a measure of how well the sacrificed fuel rod positions are utilized. This new parameter has been termed "water rod efficiency." The water rod efficiency includes consideration of three factors: 1) the cross-sectional area of the interior of the water rod; 2) the number of lattice positions which are sacrificed or displaced; and 3) the cross-sectional area of a single lattice position. The water rod efficiency is then calculated as the cross-sectional area of the water rod divided by the area of a single lattice position, relative to the number of sacrificed lattice positions.

Water rod designs are provided which are efficient in terms of space utilization and, in particular, which have a water rod efficiency greater than about 0.6, preferably greater than about 0.7. The water rods occupy a number of lattice positions which have been found to be selectable to produce the desired amount of moderation, and yet to avoid too large a decrease in active flow area and number of fuel rods.

By providing a water rod with increased efficiency, several advantages are produced. In general terms, these advantages relate to efficiency because they provide the benefits of water rods, but with a decreased need to sacrifice potential fuel rod positions.

Efficient provision of a larger volume of moderator improves the cold margin by providing more moderator closer to fuel rods. The disclosed designs improve the hot margin by increasing hot reactivity, since larger amounts of moderator are present. Therefore, the hot-to-cold swing is improved. Accordingly, the amount of gadolinium oxide can be reduced to reduce gadolinium residual.

Efficient provision of larger amounts of moderator also increases the water-to-steam ratio in the two-phase portion of the reactor. When this ratio is improved, the tendency for instabilities is reduced. Such a reduction in the instability tendency at least partially offsets the increase in pressure drop associated with larger water rods.

By providing more fuel rod positions which are adjacent to a water rod, a lager number of fuel rods are in positions of high worth (i.e., close to moderator). Therefore, less enriched and less expensive fuel can be used without sacrificing reactivity.

By providing a larger number of low-enrichment fuel rods in a bundle, a more even thermal distribution can be produced, reducing rod-to-rod and bundle-to-bundle peaking.

A water rod with larger cross-sectional area concentration in one part of the fuel bundle has been found to be preferable to the same cross-sectional area provided by a plurality of spaced-apart, smaller rods.

The efficient provision of larger amounts of moderator reduces the tendency for hydraulic and nuclear-thermal hydrodynamic instabilities. This, in turn, permits use of high-exposure fuel rods, such as a 9×9 array of potential fuel rod positions. This advantage is further beneficial because a larger number of lattice positions affords greater flexibility for placement of water rods.

By providing a new design parameter for use in designing water rods, candidate water-rod shapes can be efficiently screened, and proposed designs can be selected on an objective, efficiency basis.

Particular water rod cross-sectional shapes, which can be feasible and economically produced, are provided. The preferred configurations include a "FIG. 8" shape having two adjacent circular portions and a cross-sectional, "peanut" shape which has two substantially triangular rounded-cornered portions separated by a constricted portion. Other designs include a substantially "rectangular" cross-sectional design and a "cruciform" design having four concave portions separating four lobes. The particular designs are of feasible construction, and produce the desired efficiency and range of moderation.

A method for analyzing water rod characteristics is provided, which includes the determination of a defined water rod efficiency and substantial occupation of a number of lattice positions in a predetermined range.

A device and method for positioning and connecting the water rod with respect to the fuel rods and spacers is also provided.

BRIEF DESCRIPTION OF THE DRAWINGS

FIG. 1 is a partial perspective view of fuel bundles, positioned as in a reactor, with portions cut away to show fuel rods and water rods therein;

FIG. 2 is a graph depicting space utilization as a function of lattice positions sacrificed for various water rod designs, and indicating water rod efficiencies;

FIG. 3 is a schematic cross-sectional view showing a water rod according to the present invention;

FIG. 4 is s a partial perspective view of the water rod of FIG. 3 and nearby fuel rods;

FIG. 5 is a schematic cross-sectional view showing a water rod according to another embodiment of the present invention;

FIG. 6 is a partial perspective view of the water rod of FIG. 5 and nearby fuel rods;

FIG. 7 is a schematic cross-sectional view showing a water rod according to another embodiment of the present invention;

FIG. 8 is a partial perspective view of the water rod of FIG. 7 and nearly fuel rods;

FIG. 9 is a schematic cross-sectional view showing a water rod according to another embodiment of the present invention;

FIG. 10 is a partial perspective view of the water rod of FIG. 9 and nearby fuel rods; and FIGS. 11A—C depict a portion of a water rod and a spacer at three stages during engagement therebetween.

DETAILED DESCRIPTION OF THE PREFERRED EMBODIMENTS

In FIG. 1 a perspective view of a portion of a reactor core is provided. FIG. 1 depicts four fuel bundles 12, 14, 16, and 18, positioned as they would be in a nuclear reactor between a lower core plate 19 and an upper "top" guide 20. The fuel bundles 12, 16 are shown in partial cutaway view, without upper tie plates, exposing the interior of the bundles. A cruciform control rod 21 is depicted in a partially inserted position. Each of the four fuel bundles 12, 14, 16, and 18 contain 81 lattice positions in a regular square 9×9 array as defined, for example, at a top plate 22.

As best seen in FIG. 3, the 81 lattice positions of the array are defined by imaginary lines 24, which are spaced apart by a distance or pitch 26. Each of the 81 lattice positions represents a potential site for a fuel rod. In each fuel bundle construction, certain of these sites are occupied by tie rods (not shown) for holding together top and bottom plates for structural purposes. Most of the lattice positions are substantially occupied by basic fuel rods 28. In most fuel bundle constructions, the fuel rods are tangentially separated by a space 32. As described above, this spacing of fuel rods is preferably maintained by means of spacer devices, described more fully below. Typically, in a boiling water reactor, using a 9×9 array, the pitch 26 equals about 11 mm and the spacing 32 equals about 3 mm.

In the following, a new water-rod efficiency parameter is described, and water-rod efficiencies for a number of previous water rods are shown. Next, three particular water-rod configurations having a high water-rod efficiency, according to new efficiency parameters, are described. Finally, the way in which the water rods can be provided, and a manner in which they can joined to spacers, is described.

According to the present invention, a water rod is provided which affords a desired amount of moderating effect without over moderating. Over-moderation means providing so much moderation that overall efficiency of the reactor is undesirably diminished because of absorption of thermal neutrons. It has been found that, for these purposes, a water rod should be configured to occupy greater than four lattice positions, preferably at least five lattice positions. The water rod should also occupy less than nine lattice positions, preferably about seven or fewer lattice positions. It has been found that by providing water rods occupying this range of lattice positions, the moderating effect of the water in the water rod is sufficient for providing a desirable increase in reactor efficiency without over-moderating the reaction.

As described above, an indicator of efficiency is provided which is termed "water rod efficiency." This quantity has been found to be usefully provided by calculation as follows:

$$\frac{\text{Net Water Rod Cross-Sectional Area}}{\left(\begin{array}{c}\text{Area of a single}\\\text{lattice position}\end{array}\right)\cdot\left(\begin{array}{c}\text{number of sacrificed}\\\text{lattice positions}\end{array}\right)}$$

Referring now to FIG. 2, the net water rod cross-sectional area divided by the area of a single lattice position is shown as a function of the number of sacrificed lattice positions.

TABLE 1

| Point | Previous Device or Present Invention | Number of Sacrificed Lattice Positions | Shape | Figure |
|---|---|---|---|---|
| 34 | Previous Device | 1 | Round* | — |
| 38 | Previous Device | 1 | Round** | — |
| 42 | Previous Device | 4 | Round | — |
| 48 | Previous Device | 4 | Square | — |
| 50 | Previous Device | 9 | Square | — |
| 46 | Present Invention | 7 | Figure-8 | 9, 10 |
| 52 | Present Invention | 7 | Peanut | 3, 4 |
| 54 | Present Invention | 7 | Rectangle | 5, 6 |
| 56 | Present Invention | 5 | Cruciform | 7, 8 |

*diameter = fuel rod diameter
**diameter > fuel rod diameter

The water rod efficiency, defined by Equation No. 1 above, can be graphically seen in FIG. 2 as corresponding to the slope of a line connected to a point to the graph origin (0,0). Line 64, for example, depicts efficiencies of water rods configured as that shown for water rod 34. The efficiency for such configuration is about 0.33. Line 66 depicts the efficiency for water rods configured as water rod 38. The efficiency of such water rods is about 0.65. Line 68 depicts an efficiency of 100% or 1.0. As can be seen from FIG. 2, a number of previous water rod configurations, such as water rods of lines 64 and 66 have been limited to a water rod efficiency of less than about 0.6.

For the understanding of the following graphical representation, reference will first be made to certain prior art water rod constructions. Specific points will be plotted on the graph so that the parameter of water rod efficiency can be evaluated in terms of the prior art.

Thereafter, the designs herein developed with the help of this tool will be evaluated on the graphical representation. It will be shown that for water rods occupying more than four lattice positions but less than nine lattice positions that the graphical representation of FIG. 2 constitutes a valuable design tool.

Consider the simplest prior example of a water rod. This water rod has the same shape and inner diameter of a fuel rod. Naturally, it occupies one lattice position and is round. In order to distribute the supplemental moderator throughout the bundle, ten evenly spaced rods are considered distributed in a 9×9 array. Assuming that one such water rod only is used, such a water rod displacement will appear at location 34 on the graphical representation of FIG. 2.

Now take the same rod and multiply its location to a total number of 10 locations in the same array. Such a after rod distribution will be found to be at point 58 on the graphical representation of FIG. 2.

The connection of the points 34 and 58 by a straight line through the origin of the graph is instructive. It will be found that intermediate numbers of water rods all adhering to the same configuration, will plot at the corresponding "Lattice Positions Sacrificed" location on line 64 of the graph.

Consider the same round shape but expand the diameter of the water rod. Expansion of the water rod continues to and until the water rod reaches a maximum diameter without interfering with adjacent lattice position boundaries. Presuming that one such water rod is placed within a fuel bundle, the generation of the point 38 will be plotted.

Expanding the total number of water rods to 10 in number, the point 60 will be generated. Connecting these two points by a straight line 66 extending through the origin of the graph as before defines further the efficiency of this water rod design. Further, it will be found that intermediate numbers of water rods all adhering to the same configuration, will plot at the corresponding "Lattice Positions Sacrificed" located on line 66 of the graph.

We then have defined on FIG. 2, two lines 64 and 66 whose slope readily define relative boundaries of efficiencies for round prior art water rod and the maximum diameter of a water rod occupying single lattice positions.

The plotting of two additional prior art water rod constructions can be instructive. Consider a round water rod. Have this water rod occupy four (4) lattice positions. Such a water rod will plot at point 42 on the graph.

Now take the water rod shape and make the water rod section square instead of round. Further have the water rod occupy four lattice positions. Such a water rod will plot at point 48.

Finally, take the same square shaped water rod. Continue to expand the dimension of the water rod until nine lattice positions are occupied. A plot of the point 50 will result.

There is, however, a drawback to the configurations of the water rods of points 48 and 50. Water rod 48 has been found to occupy less than the desired number of lattice positions; water rod 50 has been found to occupy more than the number of desired lattice positions.

It has been found that water rod configurations which occupy four or fewer lattice positions, and have been found to provide too little moderation for the desired efficient reaction in the bundle resident. Other configurations occupying nine or more lattice positions, and have been found to undesirable over-moderate the reaction or sacrifice too many fuel rods.

Remembering that the slope of the lines connecting the point of origin (0,0) and a particular point on the graph of FIG. 2, it will be understood the two configurations of points 48 and 50 had highly desirable efficiencies. However, through either occupying too few lattice positions (four for point 48) or too many lattice positions (nine for point 50), respective under moderation or over moderation was present. Therefore, despite the apparent high efficiencies these designs of the prior art are not preferred.

The present invention thus includes providing a water rod configuration which both efficiently uses the lattice positions that must be sacrificed, such as providing a water rod efficiency greater than about 0.6, preferably greater than about 0.7, and provides for efficiency of nuclear reactor operation by producing moderation in a desired range.

Referring now to FIGS. 3 and 4, water rod 52 contains two topologically concave regions 74a and 74b. A topologically concave region is one in which there is at least one line segment connecting two points of the region which must pass outside of the boundary of the water rod 52. For example, taking points 100, 102, and connecting them by line 103, it can be seen line 103 passes outside of the water rod boundary.

The water rod 52 occupies seven lattice positions, and is configured to define two round-cornered triangular regions 76a and 76b, continuously connected at their respective bases 78a and 78b by a constricted region 82. This constricted region 82 is defined by two inwardly-extending longitudinal projections 84a and 84b, as best seen in FIG. 4. As seen in FIG. 4, the inwardly extending longitudinal projections define two grooves 86a and 86b in the exterior of the water rod, which are configured to accommodate portions of fuel rods 87a, 87b.

Referring now to FIGS. 5 and 6, a water rod 54 is provided, which is a topologically convex shape. A shape is topologically convex if a line segment connecting any two points does not pass outside the boundary of the water rod. For example, it can be seen that no two points connected by a line will cause the line to pass outside of the water rod.

The cross-sectional region of the water rod 54 is substantially rectangular in shape. As best seen from FIG. 5, the water rod is substantially adjacent to a least ten fuel rods positioned in the fuel rod bundle. For this purpose, a fuel rod is adjacent if its lattice position has at least an edge in common with a displaced lattice on position. The water rod 54 occupies seven lattice positions.

Turning now to FIGS. 7-8, a water rod 56 is shown, having four interiorly extending longitudinal projections 96a-96d which define therebetween four exteriorally projecting lobes 98a-98d. The interior extending projections 96a-96d define grooves 102a-102d which are configured to accommodate at least a portion of fuel rods 104a-104d within each. The water rod 56 occupies five lattice positions, and includes four topologically concave regions.

Referring now to FIGS. 9-10, a water rod 46 is shown having two substantially circular portions. The water rod is substantially adjacent to at least ten fuel rods positioned in the fuel bundle. The water rod 46 occupies seven lattice positions. The water rod 46 can be conceptually viewed as two adjacent and contracting round tubes. In this view, each of the round tubes occupies three and one-half lattice positions. This is one advantage of providing tubes in closely adjacent positions, rather than in spaced-apart positions. If the ground tubes were isolated, each would occupy four lattice positions. By positioning two tubes adjacent to form a single "FIG. 8" water rod, only seven positions are occupied in total, for a savings of one lattice position.

Plotting of the designs in the graphical representation of FIG. 2 can be instructive. First, it can be seen that the graphical plot of embodiment of FIGS. 3 and 4 plots at point 52 on the graph. This point yields an efficiency of over (0.91) and has the highest efficiency of the designs developed herein. Accordingly, it is preferred.

Plotting of the design of FIGS. 5 and 6, plots at point 54 on the graph. This point yields a lower efficiency (0.77) than the design of FIGS. 3 and 4, but shows structurally a design that is easy to fabricate. This design is not as preferred as the embodiment of FIGS. 3 and 4, but is nevertheless highly advantageous.

The four leaf or "clover" design of FIGS. 7 and 8 has high efficiency. It also includes occupation of 5 lattice positions, with the requisite range of lattice positions occupied to produce sufficient moderation. The efficiency of this design is (0.83). This design, because of its complexity of manufacture, is subordinate in preference to the design of FIGS. 3 and 4.

Finally, the two adjacent round rods of FIGS. 9 and 10 exhibits high efficiency. It is noted, however, this design is truncated by a chord-presenting a difficulty of manufacture. This design has an efficiency of (0.76).

As noted above, the water rods and fuel rods are maintained in a spaced-apart configuration using spacers. In previous configurations, such as circular and square configurations, some amount of rotation about the longitudinal axis of a water tube was possible without interfering with adjacent fuel rods. This characteristic was used to attach or latch a water rod to a spacer to prevent relative axial motion. In such method, a tab was provided on an exterior surface of the water tube. The water tube was moved longitudinally with respect to the spacer until the tab was aligned with, but offset from, an engaging or latching portion of the spacer. The tube was then rotated about its longitudinal axis to bring the tab into engagement with the engaging or latching portion of the spacer.

The present invention includes providing a different method for maintaining the axial position of a water rod with respect to a spacer. Although this method can be used with a variety of water rods, it is especially useful when rotation of a water rod about its longitudinal axis is impractical or impossible.

According to the present invention, a recess is defined on a portion of an exterior surface of a water rod. The recess can be defined by protrusions extending from the water rod, either integrally formed or attached by welding, brazing, adhering, and the like. The configuration of the water rod is such that the position of the recess with respect to the spacer can be changed by resilient deflection. In the preferred embodiment, the portion of the sidewall of the water tube adjacent to the recess has an amount of resilience. There is enough resilience that a portion of the sidewall near the recess can be inwardly deflected to effect movement of the recess portion. The resiliency also permits later springing back of the sidewall to substantially its original shape for engagement of the recess portion with a portion of the spacer.

Referring now to FIGS. 11A-11C, protrusions 110 are integrally formed on an exterior surface of a water rod 112. The water rod protrusions 110 define a recess 114. The spacer 116 has a structure with a shape complementary to the recess. The water rod is axially slid with respect to a spacer assembly 116 until the protrusion 110 contacts at least a portion of the spacer assembly 116. Continuing axial movement of the water rod results in the water rod 112 being resiliently deflected, such as by engagement with a camming surface of the spacer assembly. This causes inward deflection of the sidewall of the water rod 112, as best seen in FIG. 11B. Further axial movement of the water rod with respect to the spacer assembly permits the recess 114 to become aligned with the engaging of the spacer assembly 116. Such engagement permits the water rod sidewall 112 to resiliently return to substantially its original position, as seen in FIG. 11C. The water rod 112 is thus in engaging or latching position with respect to the spacer, thereby maintaining the axial position of the spacer assembly 116 with respect to the water rod 112.

Preferred circumferential positions for water rod protrusions are depicted in FIGS. 3, 5, and 7. In FIG. 3, a protrusions 120 is provided on the exterior surface of the water rod 52 in one of the grooves 86b. In FIG. 5 a protrusion 122 is provided on an exterior surface of one of the long sidewalls of a rectangular water rod 54. In FIG. 7 a protrusion 124 is provided in one of the grooves 102c of the water rod 56. The water rod depicted in FIG. 9 is preferably attached to spacer configurations by rotation around longitudinal axes of the round tubes, as described above.

Although a number of possible water rod configurations are conceivable, only some configurations can be, in a practical sense, accurately and economically manufactured in the quantities needed. The water rod configurations 52, 54, 56, and 46 depicted in FIGS. 3, 5, 7 and 9, respectively, can be accurately and economically made in quantity. One method of manufacture involves beginning with conventionally-shaped, preferably thin-walled (e.g., 30–35 mils or about 0.75–0.85 mm), tubular bodies, such as circular or square cross-sectional bodies. The bodies are shaped as needed by cold-drawing through one or more dies to provide the desired configurations. The shaping can include the formation of grooves 86a, 86b, 102a–102d, lobes 98a–98d, or corners, as shown in FIGS. 3–8. The water rod 54 depicted in FIGS. 5–6 can also be made by joining, such as by welding, two U-shaped channels.

The configurations depicted in FIGS. 3–10 have been found to represent viable configurations in the sense that they provide the desired efficiencies and moderation, and are manufacturable in a practical sense.

The present invention includes a method of designing water rods to provide a water rod configuration which is practical and provides for a desired efficiency and desired moderation. Previous substantially empirical methods involved selecting a water rod configuration, typically without knowing the efficiency thereof. Many other reactor designs considerations are dependent upon the choice of water rod configuration. Thus, once a choice was made, redesign was so prohibitively expensive that the process often involved commitment to a design before the pertinent characteristics of the design could be empirically determined. In contrast, the present invention includes calculation of water rod efficiencies and lattice position displacements for two or more designs, and selecting a design using the calculated efficiencies and displacements. In this manner, water rods can be designed with knowledge of their efficiencies and displacements. The likelihood of later difficult and expensive redesign, dependent on the choice of water rod configuration, is, therefore, lessened.

As will be apparent to those skilled in the art, a number of modifications and variations of the disclosed embodiments can also be practiced. Other cross-sectional configurations of water rods can be used, provided they produce a water rod efficiency greater than about 0.6, preferably greater than about 0.7, and produce the desired range of moderation. More than one water rod could be provided in a single fuel rod bundle, and different shapes of water rods can be provided in different bundles, although, preferably, the same shape is used in all bundles. Water rods can be provided which combine characteristics of various disclosed water rods.

Because fuel for fuel rods a typically produced with a standard cross-sectional configuration, fuel rods are typically integral in that they either occupy all of a fuel rod position, as depicted in FIG. 2, or are entirely absent. However, it is also possible to provide an increased size axially or a changed-configuration of fuel rods to accommodate water rods of different shapes, with appropriate modifications to the calculation of efficiency, degree of moderation, and displaced flow area.

Other methods of manufacture of water rods can be used, including casting, milling, rolling, hot-drawing, and the like.

The attachment of a water rod to a spacer can be achieved by deflection of a tab without substantial sidewall deflection of a water rod, or by deflection of a portion of the spacer assembly without requiring deflection of the water rod, or some combination thereof.

Although the description of the present invention has included a description of the preferred embodiments, other modifications and variations are included within the spirit and scope of the invention as limited only by the appended claims.

What is claimed is:

1. A water rod, usable for containing water in a substantially interior position in a nuclear fuel rod bundle, the bundle having a plurality of lattice positions spaced at a predetermined lattice pitch, comprising:

a hollow longitudinally extending tube having a sidewall which defines a cross-sectional interior region of said tube, configured to substantially occupy a predetermined number of the lattice positions of the bundle;

said cross-sectional interior region being configured to define two round-cornered, triangular regions continuously connected by a constricted region, said constricted region being defined by two inwardly extending longitudinal projections;

wherein said predetermined number is greater than four lattice positions and less than nine lattice positions; and wherein said area of said cross-sectional region, said predetermined number, and said pitch define a water rod efficiency greater than about 0.7; and, at least one projection on an exterior portion of said sidewall; and wherein said sidewall has sufficient resiliency to permit inward flexing of said sidewall, at least in a portion substantially adjacent to said projection, to permit passage of said projection over an obstruction when said water rod is axially moved proximate to said obstruction.

2. A water rod, as claimed in claim 1, wherein said predetermined number is seven.

3. A water rod, usable for containing water in a substantially interior position in a nuclear fuel rod bundle, the bundle having a plurality of lattice positions spaced at a predetermined lattice pitch, comprising:

a hollow longitudinally-extending tube having a sidewall which defines a cross-sectional interior region of said tube, configured to substantially occupy a predetermined number of lattice positions of the bundle;

said cross-sectional interior region being configured to define four interiorly-extending longitudinal projections defined therebetween four exteriorly-projecting lobes;

wherein said predetermined number is greater than four lattice positions and less than nine lattice positions; and wherein said area of said cross-sectional region, said predetermined number, and said pitch define a water rod efficiency greater than about 0.7; and, at least one projection on an exterior portion of said sidewall; and wherein said sidewall has sufficient resiliency to permit inward flexing of said sidewall, at least in a portion substantially adjacent to said projection, to permit passage of said projection over an obstruction when said water rod is axially moved proximate to said obstruction.

4. A water rod, as claimed in claim 2, wherein said predetermined number is five.

5. A water rod, usable for containing water in a substantially interior position in a nuclear fuel rod bundle, the bundle having a plurality of lattice positions spaced at a predetermined lattice pitch, comprising:
   a hollow longitudinally-extending tube having a sidewall which defines a cross-sectional interior region of said tube, configured to substantially occupy a predetermined number of lattice positions of the bundle;
   said cross-sectional interior region being configured to define a substantially rectangular shape;
   wherein said predetermined number is greater than four lattice positions and less than nine lattice positions; and
   wherein said area of said cross-sectional region, said predetermined number, and said pitch define a water rod efficiency greater than about 0.7.

6. A water rod, as claimed in claim 5, wherein said predetermined number is seven.

7. A water rod, as claimed in claim 5, further comprising:
   at least one projection attached to an exterior portion of said sidewall; and
   wherein said sidewall has sufficient resiliency to permit inward flexing of said sidewall, at least in a portion substantially adjacent to said projection, to permit passage of said projection over an obstruction when said water rod is axially moved proximate to said obstruction.

8. A water rod, usable for containing water in a substantially interior position in a nuclear fuel rod bundle, the bundle having a plurality of lattice positions spaced at a predetermined lattice pitch, comprising:
   a hollow, longitudinally extending tube having a sidewall which defines a cross-sectional interior region of said tube, configured to substantially occupy a predetermined number of lattice positions of the bundles;
   said cross-sectional interior region being configured to define two substantially circular portions, said circular portions being substantially adjacent;
   wherein said predetermined number is greater than four lattice positions and less than nine lattice positions; and
   wherein said area of said cross-sectional region, said predetermined number, and said pitch define a water rod efficiency grater than about 0.6.

9. A water rod, as claimed in claim 8, herein said predetermined number is seven.

10. A water rod, as claimed in claim 8, further comprising:
    at least one projection on an exterior portion of said sidewall; and
    wherein said sidewall has sufficient resiliency to permit inward flexing of said at least in a portion substantially adjacent to said projection, to permit passage of said projection over said first means when said water rod is axially moved proximate to said first means.

11. A nuclear fuel rod bundle comprising:
    first means for spatially positioning rods wherein said means defines a lattice having a plurality of lattice positions and a lattice pitch;
    a plurality of nuclear fuel rods operably connected with said means for positioning, wherein said nuclear fuel rods occupy at least some of said lattice positions;
    at least one hollow longitudinally extending tube having a sidewall which defines a cross-sectional interior region of said tube, configured to substantially occupy greater than four and fewer than nine lattice positions of said lattice;
    said cross-sectional interior region being configured to define two round-cornered triangular regions continuously connected by a constricted region, said constricted region being defined by two inwardly extending longitudinal projections;
    wherein the area of said cross-sectional region for said tubes, said number of occupied positions for said tubes, and said pitch define a water rod efficiency greater than about 0.7; and,
    at least one projection on an exterior portion of said sidewall; and
    wherein said sidewall has sufficient resiliency to permit inward flexing of said sidewall, at least in a portion substantially adjacent to said projection, to permit passage of said projection over an obstruction when said water rod is axially moved proximate to said obstruction.

12. A nuclear fuel rod bundle, as claimed in claim 11, wherein the number of said lattice positions occupied by said tubes is seven.

13. A nuclear fuel rod bundle comprising:
    first means for spatially positioned rods wherein said means defines a lattice having a plurality of lattice positions and a lattice pitch;
    a plurality of nuclear fuel rods operably connected with said means for positioning, wherein said nuclear fuel rods occupy at least some of said lattice positions;
    at least one hollow longitudinally extending tube having a sidewall which defines a cross-sectional interior region of said tube, configured to substantially occupy greater than four and fewer than nine lattice positions of said lattice; and
    said cross-sectional interior region being configured as a rectangle; and
    wherein the area of said cross-sectional region of said tubes, said number of occupied positions of said tubes, and said pitch define a water rod efficiency greater than about 0.7.

14. A nuclear fuel rod bundle, as claimed in claim 13, wherein the number of lattice positions occupied by said tubes is 7.

15. A nuclear fuel rod bundle, as claimed in claim 13, further comprising:
    at least one projection attached to an exterior portion of said sidewall; and
    wherein said sidewall has sufficient resiliency to permit inward flexing of said sidewall, at least in the portion substantially adjacent to said projection, to permit passage of said projection over said first means when said water rod is axially moved proximate to said first means.

16. A nuclear fuel rod bundle comprising:
    first means for spatially positioning rods wherein said means defines a lattice having a plurality of lattice positions and a lattice pitch;

a plurality of nuclear fuel rods operably connected with said means for positioning, wherein said nuclear fuel rods occupy at least some of said lattice positions;

at least one hollow longitudinally extending tube having a sidewall which defines a cross-sectional interior region of said tube, configured to substantially occupy greater than four and fewer than nine lattice positions of said lattice;

said cross-sectional interior region being configured to define two substantially circular regions being substantially adjacent; and wherein the area of said cross-sectional region of said tubes, said number of occupied positions of said tubes, and said pitch define a water rod efficiency greater than about 0.6.

17. A nuclear fuel rod bundle, as claimed in claim 16, wherein the number of said lattice positions occupied by said tubes is seven.

18. A nuclear fuel rod bundle, as claimed in claim 16, further comprising:

at least one projection on an exterior portion of said sidewall; and wherein said sidewall has sufficient resiliency to permit inward flexing of said sidewall, at least in a portion substantially adjacent to said projection, to permit passage of said projection over said first means when said water rod is axially moved proximate to said first means.

* * * * *